US006988682B2

(12) United States Patent
Hautala

(10) Patent No.: US 6,988,682 B2
(45) Date of Patent: Jan. 24, 2006

(54) METHOD AND SYSTEM FOR UTILIZING WASTE

(75) Inventor: Jouko Hautala, Tampere (FI)

(73) Assignee: Metso Paper, Inc., Helsinki (FI)

( * ) Notice: Subject to any disclaimer, the term of this patent is extended or adjusted under 35 U.S.C. 154(b) by 211 days.

(21) Appl. No.: 10/276,946

(22) PCT Filed: May 22, 2001

(86) PCT No.: PCT/FI01/00494

§ 371 (c)(1),
(2), (4) Date: May 19, 2003

(87) PCT Pub. No.: WO01/89702

PCT Pub. Date: Nov. 29, 2001

(65) Prior Publication Data

US 2004/0035959 A1 Feb. 26, 2004

(30) Foreign Application Priority Data

May 22, 2000 (FI) ............................................ 20001218

(51) Int. Cl.
*B02C 23/36* (2006.01)

(52) U.S. Cl. .................. 241/21; 241/24.18; 241/24.19; 241/46.17

(58) Field of Classification Search .................. 241/21, 241/24.18, 24.19, 46.11, 46.17
See application file for complete search history.

(56) References Cited

U.S. PATENT DOCUMENTS 3,736,223 A 5/1973 Marsh
5,100,066 A 3/1992 Frei
6,409,883 B1 * 6/2002 Makolin et al. .............. 162/52

FOREIGN PATENT DOCUMENTS

| | | |
|---|---|---|
| DE | 39 34 478 | 4/1991 |
| EP | 0 742 311 | 11/1996 |
| FI | 54936 | 6/1972 |
| GB | 1364474 | 8/1974 |
| GB | 2026019 | 1/1980 |
| WO | WO 90/14890 | 12/1990 |
| WO | WO 98/18607 | 5/1998 |
| WO | WO 01/89702 | 11/2001 |

OTHER PUBLICATIONS

Search Report issued in Finnish Priority Application No. 20001218.
International Search Report issued in International Application No. PCT/FI01/00494.
International Preliminary Examination Report issued in International Application No. PCT/FI01/00494.

* cited by examiner

*Primary Examiner*—Mark Rosenbaum
(74) *Attorney, Agent, or Firm*—Stiennon & Stiennon

(57) ABSTRACT

Waste that contains fibers and combustible material is slushed in a continuous-operation high-consistency pulper (10) to suspend in water the fibers contained in the waste. From the pulper (10) are discharged substantially continuously a fiber suspension ($P_1$) through a screen plate; and non-defibrable material ($R_1$) by means of a mechanical transfer device (22). The fiber suspension ($P_1$) is sorted and cleaned for use as raw material in paper or board. The non-defibrable material ($R_1$) and the rejects ($R_2$–$R_4$) separated from the fiber suspension ($P_1$) in the sorting and cleaning stages are used as fuel in energy production and/or utilized as raw material.

22 Claims, 1 Drawing Sheet

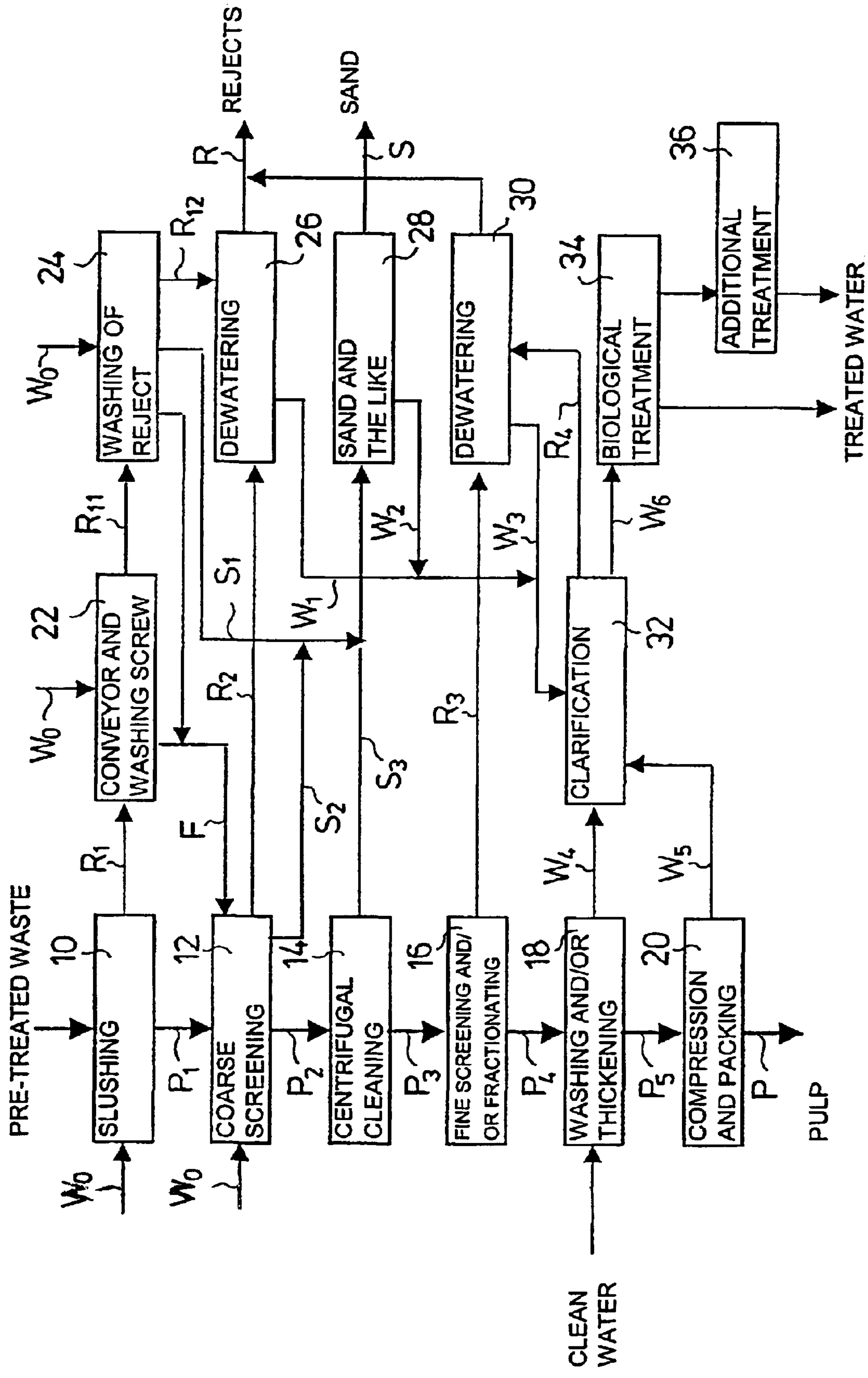
PRE-TREATED WASTE
SLUSHING
10
W0
COARSE SCREENING
12
CENTRIFUGAL CLEANING
14
FINE SCREENING AND/ OR FRACTIONATING
16
WASHING AND/OR THICKENING
18
COMPRESSION AND PACKING
20
P1
P2
P3
P4
P5
P
PULP
CLEAN WATER
R1
CONVEYOR AND WASHING SCREW
22
R11
WASHING OF REJECT
24
R12
DEWATERING
26
SAND AND THE LIKE
28
DEWATERING
30
BIOLOGICAL TREATMENT
34
ADDITIONAL TREATMENT
36
CLARIFICATION
32
F
R2
S2
S3
R3
W4
W5
S1
W1
W2
W3
R4
W6
R
REJECTS
S
SAND
TREATED WATER

METHOD AND SYSTEM FOR UTILIZING WASTE

CROSS REFERENCES TO RELATED APPLICATIONS

This application is a U.S. national stage application of International Application No. PCT/FI01/00494, filed May 22, 2001, and claims priority on Finnish Application No. 20001218 filed May 22, 2000, the disclosures of both of which applications are incorporated by reference herein.

STATEMENT AS TO RIGHTS TO INVENTIONS MADE UNDER FEDERALLY SPONSORED RESEARCH AND DEVELOPMENT

Not applicable.

BACKGROUND OF THE INVENTION

The invention relates to a method and system for utilizing waste that contains fibres and combustible material. In addition, the invention relates to a method for processing fibre in a paper or board mill that utilizes recycled fibre pulp.

Conventionally, the options available in waste disposal and processing have been: transport to landfill sites, incineration in mass incineration plants and—to a limited extent—recovery of recyclable materials. The last-mentioned option generally requires separation of wastes at the source, wherein recyclable waste fractions, such as biowaste, paper and board, and glass and metals are separated and collected separately. However, source separation is always insufficient, which means that the amount of mixed waste is now, and will also be in future, considerable.

The form of energy recovery that has become popular recently is one in which recovered and/or refuse-derived fuel (REF, RDF) processed from waste is burned either in conventional boilers together with other fuel or as the main fuel in combustion plants specially designed for recovered/refuse-derived fuel. The wastes most suitable for energy recovery include packaging, paper and plastic wastes from industry and commerce as well as construction wastes, which can constitute as much as 70 to 80% of the amount of waste usually transported to landfills. Dry household waste can also be used in the production of energy provided that, among other things, metals, glass and biowaste have been separated from it first.

Most economically, recovered fuel is produced from a source-separated combustible waste fraction, i.e. the so-called energy fraction of waste. The processing stages of this REF fuel (recovered fuel) typically include removal of oversized pieces, crushing of waste, separation of metals as well as removal of sand and stones. Finished REF fuel contains predominantly plastics, wood, paper and board. The proportion of impurities in the fuel may be, for example, of the order of 5% depending on the sorting process. Recovered fuel can also be produced from unsorted mixed waste by mechanical handling processes, in which case the end product is called RDF fuel (refuse-derived fuel). A difference with respect to the handling of source-separated waste is constituted by a more mixed composition of the waste raw material, which is mainly shown as a higher biowaste content. Consequently, more sorting stages are needed in the production of RDF fuel than at an REF plant, for example, gravimetric separation stages, i.e. sorting stages based on the size and density of particles, whereby heavy matter, such as food scraps, can be efficiently separated from the fraction intended for combustion. The composition of finished RDF fuel is very much like that of REF fuel, but the proportion of impurities in it can be slightly higher, for example, of the order of 8%.

Energy recovery from waste should not be an end in itself, but rather aim for sensible macroeconomical reclamation of wastes or for making them harmless. In all reclamation of waste, the primary object should be recovery of materials contained in waste when it is economically profitable and, only secondarily, utilization of waste as fuel. Landfilling should be the very last option.

WO application publication 98/18607 discloses a process for treatment of waste that contains recyclable components, in which process waste is agitated in water employing mechanical force, whereby the size of pieces in waste is reduced and fibres are suspended in water. The heavy fraction containing metals, the lightweight fraction containing plastics and the fraction containing fibres are separated from the suspension in stages. The process is intended for treatment of packaging waste which contains different plastics and mixed materials, in particular board lined with plastic and/or metal foils, and metal cans. The fibre content of this kind of raw material is generally relatively low, wherefore the special problems associated with the recovery of fibres and with the quality of pulp have not been taken into consideration to a sufficient degree in the process. The publication has also failed to take into account matters that form an integral part of the recovery of fibres, such as, meeting of energy demand and circulation of waters.

The recovery of fibres from waste is also discussed, among other things, in GB patent 1,364,474 and in published GB application 2,026,019.

SUMMARY OF THE INVENTION

One object of the invention is to make it possible to recover a larger and higher quality portion than before of those fibres contained in waste which until now have been either passed to incineration or taken to a landfill site.

In the method according to the invention, waste is slushed in a continuous-operation high-consistency pulper in order to suspend in water the fibres contained in the waste, and from the pulper are discharged substantially continuously, on the one hand, fibre suspension through a screen plate and, on the other hand, non-defibrable material by means of a mechanical transfer device. The fibre suspension is sorted and cleaned for use as raw material in paper or board and the non-defibrable material as well as the rejects separated from the fibre suspension in sorting and cleaning stages are used as fuel in energy production and/or utilized as raw material.

Advantageously, the pulper is provided with a screw conveyor, which moves non-defibrable material from the pulper to a reject drum. As the amount of reject is relatively high when slushing mixed waste, conventional arrangements for removal of reject are not sufficient. In order to make the recovery of fibres more effective, this material containing an abundance of plastics is washed first on the screw conveyor and then further in the reject drum and the washing waters used in both washing stages are passed so as to be mixed with the fibre suspension.

Advantageously, the pulper has been arranged to operate at a temperature of about 60° C., in which connection, on the one hand, defibration is efficient and, on the other hand, bacteria and other micro-organisms carried with waste material do not cause any hygienic harm. Slushing consistency is generally about 10%. The fibre suspension is discharged from the pulper through a screen plate in which the diameter of holes is 8–15 mm, most advantageously about 10 mm.

The particles which are larger than this hole size are passed so as to be mixed with the non-defibrable material.

After slushing, the fibre suspension is course screened to remove the reject particles still remaining in it. In coarse screening, a perforated screen is used in which the diameter of holes is 2–4 mm, most advantageously about 3 mm. In that connection, pulp is sufficiently clean for the next process stage, which is usually centrifugal cleaning. The function of centrifugal cleaning is to remove sand and other heavy particles from the pulp. After that, the pulp is fine screened and possibly fractionated for various uses. As there is an abundance of relatively inexpensive raw material available, in the fibre recovery line according to the invention there is no need to attempt to maximise the yield of fibres, as in conventional recycling processes, but the quality of fibres can be optimised. Thus, fine screening can be enhanced and the amount of reject increased as compared with conventional fibre recovery processes. Disposal of the increased reject volume presents no problem because said reject can be combusted together with the rejects derived from slushing and coarse screening.

After fine screening, the pulp is washed to improve the quality of the end product. Advantageously, the washed pulp is compressed in the end to a dry matter content of about 50%, after which it is ready for transport to a site of use situated at a reasonable distance. Alternatively, the pulp can be dried for transport to a dry matter content of about 90% or delivered as wet to a paper or board machine located in the immediate vicinity.

The fibre recovery process according to the invention consumes a considerable amount of water, which makes it necessary to clean and recirculate the process waters. The waste waters produced in different process stages are collected, treated and returned to the process. Cleaning can be accomplished, for example, as biological treatment, which is followed by clarification and, when needed, by further treatment stages for part of the water amount. The clean water necessary for the water balance of the system is introduced into the pulp washing stage at which it improves the quality of the end product.

Sand is separated from the reject fractions for transport, for example, to a landfill site or for use as earth filling. Water is removed mechanically from combustible reject fractions and it is passed so as to be cleaned. To combustion can be passed, among other things, the non-defibrable material which comes from slushing and from which sand has been separated in a reject drum, the reject from coarse screening, the reject from fine screening as well as the fibre-containing sludge formed in clarification of waste water.

Advantageously, the waste utilized in the process according to the invention is dry waste or mixed waste that has been pre-treated into a form suitable for recovered/refuse-derived fuel. The possible pre-treatment stages include a reduction in size of the pieces of waste, for example, by crushing as well as removal of metals and other undesirable waste fractions. The waste raw material can also be replaced partially or totally with paper and/or board waste collected separately. In this case, too, the process differs from prior art fibre recovery lines, among other things, in the respect that the rejects from the fibre line have in it a clear and economically profitable site of use in the production of energy.

The method described above, in which fine screening is enhanced to improve the quality of fibre material and the reject portion increased as a result of it is passed to the energy production of the plant, is also particularly advantageous in the stock circulation of paper and board machines, in particular of OCC board machines, also when recycled fibre pulp is used as raw material. Today, to maximize the yield of fibres, the reject from screening is returned to the main stock flow, in which connection poor material circulates in the process. As a result of this, the runnability of the paper or board machine deteriorates and the quality of the end product decreases. Optimisation of fine screening and passing of the reject to the boiler of the mill offer a new possibility of optimising the quality of the end product in an economical manner.

BRIEF DESCRIPTION OF THE DRAWINGS

In the following, the principle of the invention will be further described with reference to the appended FIGURE which shows one system according to the invention for utilizing waste.

DESCRIPTION OF THE PREFERRED EMBODIMENTS

Pre-treated waste is passed to a fibre separation process, which waste has been crushed and screened and from which non-combustible and undesirable fractions, such as metal, glass, stones, biowaste, etc. have been removed. The waste material is slushed in a continuous-operation high-consistency pulper 10, advantageously at a temperature of about 60° C. A material stream $P_1$ containing fibres suspended in water and a material stream $R_1$ containing non-defibrable waste are discharged substantially continuously from the pulper 10. A screw conveyor 22 moves the reject fraction $R_1$ from the pulper 10 into a combined washing and drying drum 24 of the reject. The reject is washed by means of circulation water $W_0$ both on the screw conveyor 22 and in the washing drum 24, and fibre-containing washing waters F are returned to be mixed with the fibre suspension $P_1$.

The fibre fraction $P_1$ taken out of the pulper 10 through a screen plate is passed to coarse screening 12, in which coarse impurities $R_2$ and sand $S_2$ which still remain in the fibre suspension are removed from it. The diameter of the holes in the screen plates used in the pulper 10 is 8–12 mm and most advantageously about 10 mm. In the coarse screening 12 of pulp, screen plates are used in which the diameter of holes is 2–4 mm and most advantageously about 3 mm. A correctly selected hole size is required in order that, on the one hand, the screen shall not retain an excessive amount of fibres and, on the other hand, centrifugal cleaning 14 provided after the coarse screening 12 should function sufficiently well.

In the centrifugal cleaning stage 14, mainly sand and other heavy matter $S_3$ are separated from coarse-screened pulp $P_2$. After the centrifugal cleaning 14, pulp $P_3$ is passed to a fine screening and/or fractionating stage 16, from which reject $R_3$ is passed to a dewatering stage 30 and accept $P_4$ is passed to pulp washing and/or thickening stages 18. The washing of pulp can comprise either one or two stages. In the last process stage 20, washed Pulp $P_5$ is compressed to a dry matter content of about 50% and packed in transport containers for transport to a location of use situated at a reasonable distance.

Slushing reject $R_{12}$ washed by means of the conveyor screw 22 and the reject drum 24 is passed to dewatering 26, which can be accomplished, for example, by means of a screw press. The reject $R_2$ from the coarse screening 12 is processed together with the reject $R_{12}$ coming from the slushing process. After dewatering, rejects R are passed to useful use, for example, to combustion.

Heavy sand-containing waste fractions $S_1$–$S_3$ are also separated in the reject drum 24, in the coarse screening 12 of pulp and in the centrifugal cleaning 14, and water is removed from these fractions in a processing stage 28, after which sand S can be transported to a landfill site or used as earth filling.

Rejects $R_3$ produced in the fine screening and fractionating are passed to the dewatering 30, which can be accomplished, for example, by means of a drainage band press, after which the rejects are passed to combustion.

Waste waters are produced, on the one hand, when water is removed from the rejects and sand (filtrates $W_1$–$W_3$) and, on the other hand, in washing, thickening and compression of pulp (filtrates $W_4$–$W_5$). These contaminated water fractions $W_4$–$W_5$ are passed to clarification 32, from which fibre-containing sludge $R_4$ is passed together with the reject $R_3$ from the fine screening to the dewatering 30 and further to combustion. Clarified waste water $W_6$ is passed further to a biological treatment stage 34, after which the cleaned water can be circulated to the beginning of the process for use as washing or dilution water in the pulper 10, in the coarse screening 12, on the screw conveyor 22 and/or in the reject drum 24. Alternatively, part of the biologically treated waste water can be passed to additional treatment stages 36, which may be, for example, ultra- or nanofiltration. The clean water necessary for the water balance of the process is passed to the pulp washing stages 18.

In place of the pulper and the reject drum there may be a drum pulper, which, however, requires a larger space and higher investments than the arrangement shown in the FIGURE. Moreover, removal of sand is more difficult to accomplish in the drum pulper alternative.

What is claimed is:

1. A method for utilizing waste that contains fibres and combustible material, the method comprises the stages in which:

waste is slushed in a continuous-operation high-consistency pulper to suspend in water the fibres contained in the waste;

from the pulper are discharged substantially continuously fibre suspension through a screen plate and non-defibrable material by means of a mechanical transfer device;

the fibre suspension is sorted and cleaned for use as raw material in paper or board; and the non-defibrable material and rejects separated from the fibre suspension in the sorting and cleaning stages are used as fuel in energy production and/or utilized as raw material.

2. The method of claim 1 wherein the non-defibrable material is moved from the pulper by a screw conveyor into a reject drum, and wherein the non-defibrable material is washed in both the screw conveyor and the reject drum and washing waters are passed so as to be mixed with the fibre suspension.

3. The method of claim 1 wherein the waste is slushed at a temperature of about 60° C.

4. The method of claim 1 wherein the fibre suspension is discharged from the pulper through a screen plate having holes with a diameter of 8 to 15 mm.

5. The method of claim 4 wherein the diameter of the holes is about 10 mm.

6. The method of claim 1 wherein after slushing, the fibre suspension is coarse screened using a perforated screen having holes with a diameter of 2 to 4 mm.

7. The method of claim 6 wherein the diameter of the holes is about 3 mm.

8. The method of claim 1 wherein, after slushing, the fibre suspension is coarse screened, centrifugally cleaned, fine screened and washed, and finally the washed pulp is compressed to a dry matter content of about 50%.

9. The method of 1 wherein the waste waters produced in the different stages of the process are treated and returned to the process, and that the clean water required by the process is introduced to a pulp washing stage.

10. The method of claim 1 wherein, before slushing, the waste is pre-treated to reduce the size of pieces in it and to remove any undesirable waste fractions.

11. The method of claim 1 wherein the waste to be utilized is recovered fuel processed from source-separated combustible waste.

12. A system for utilizing waste that contains fibres and combustible material, the system comprising:

a pulper to separate fibres from non-defibrable material;

devices for sorting and cleaning a fibre suspension separated from the waste;

wherein the pulper is a continuous-operation high-consistency pulper which has been provided with means for discharging the fibre suspension substantially continuously through a screen plate and with a mechanical transfer device for removing non-defibrable material substantially continuously from the pulper; and devices for using the non-defibrable material and rejects separated by means of the sorting and cleaning devices as fuel in the production of energy.

13. The system of claim 12 wherein the pulper is provided with a screw conveyor arranged to move the non-defibrable material from the pulper into a reject drum, and the screw conveyor and the reject drum have a means for washing the non-defibrable material and for passing washing water so as to be mixed with the fibre suspension discharged from the pulper.

14. The system of claim 12 wherein the pulper operates at a temperature of about 60° C.

15. The system of claim 12 wherein the pulper screen plate has holes with a diameter of 8 to 15 mm.

16. The system of claim 15 wherein the holes have a diameter of about 10 mm.

17. The system of claim 12 wherein the pulper is followed by a coarse screening device having holes with a diameter of 2 to 4 mm.

18. The system of claim 17 wherein the holes have a diameter of about 3 mm.

19. The system of claim 12 further comprising devices for cleaning waste waters produced in the different process stages and for returning them to the process.

20. The system of claim 12 further comprising devices for reducing the size of pieces in the waste and for removing undesirable waste fractions before slushing.

21. The system of claim 12 wherein the system is arranged to utilize recovered fuel processed from source-separated combustible waste.

22. A method for treatment of fibre in a paper or board mill utilizing recycled fibre pulp, comprising the steps of:

slushing pulp containing fibre material in a continuous-operation high-consistency pulper to suspend in water the fibres contained in the waste;

discharging from the pulper substantially continuously a fibre suspension through a screen plate, and non-defibrable material by means of a mechanical transfer device, the screen plate performing coarse screening;

followed by centrifugal cleaning;

followed by fine screening or fractionating;

wherein in the step of fine screening or fractionating, the quality of accept is optimised for use in manufacturing an end product; and wherein the quality of accept is optimized by changing the proportion of reject, and at least part of the reject is passed, together with the reject from the coarse screening, to energy production.

* * * * *